(No Model.) 3 Sheets—Sheet 1.

J. CROSSLEY.
APPARATUS FOR MOLDING EARTHENWARE, &c.

No. 474,496. Patented May 10, 1892.

Witnesses:
Henry Drury
Jesse Heller

Inventor:
Joseph Crossley,
per Chas. F. Nolan,
Attorney.

(No Model.) 3 Sheets—Sheet 2.

J. CROSSLEY.
APPARATUS FOR MOLDING EARTHENWARE, &c.

No. 474,496. Patented May 10, 1892.

Witnesses:
Harry Drury
Jesse Heller

Inventor:
Joseph Crossley,
per John B. Nolan,
Attorney.

THE NORRIS PETERS CO., PHOTO-LITHO., WASHINGTON, D. C.

(No Model.) 3 Sheets—Sheet 3.
J. CROSSLEY.
APPARATUS FOR MOLDING EARTHENWARE, &c.
No. 474,496. Patented May 10, 1892.
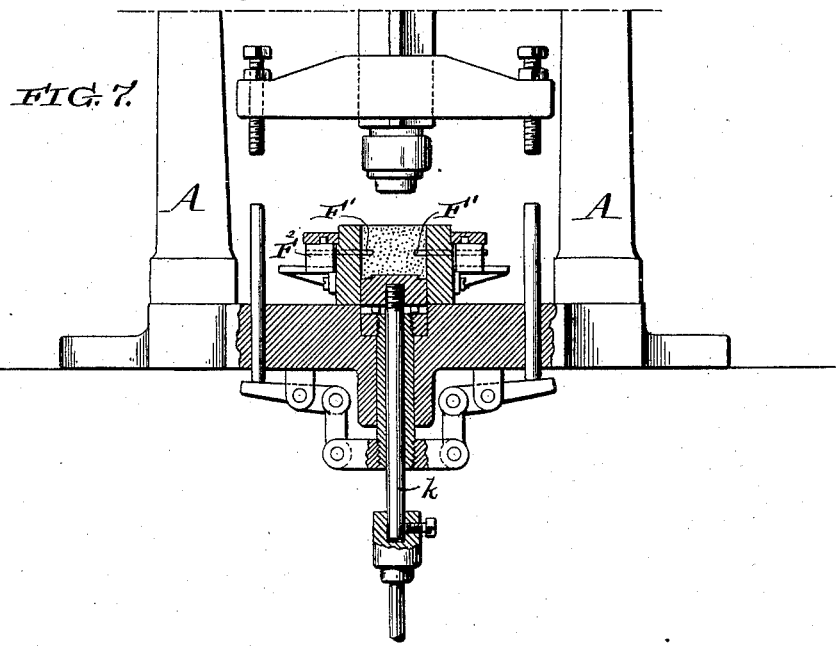
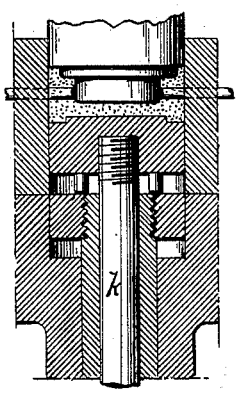
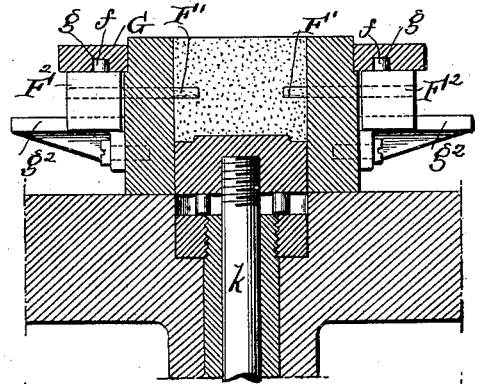
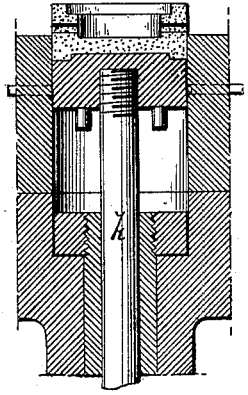
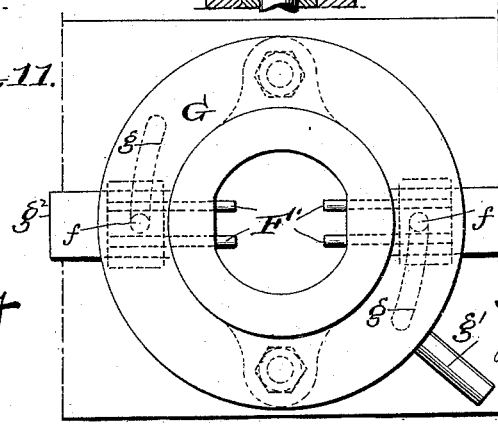
Witnesses:
Henry Drury
Jesse Hellert
Inventor:
Joseph Crossley,
per John F. Nolan,
Attorney.

UNITED STATES PATENT OFFICE.

JOSEPH CROSSLEY, OF TRENTON, NEW JERSEY.

APPARATUS FOR MOLDING EARTHENWARE, &c.

SPECIFICATION forming part of Letters Patent No. 474,496, dated May 10, 1892.

Application filed March 14, 1891. Serial No. 384,988. (No model.)

*To all whom it may concern:*

Be it known that I, JOSEPH CROSSLEY, a citizen of the United States, residing at Trenton, in the county of Mercer and State of New Jersey, have invented certain new and useful Improvements in Apparatus for Molding Earthenware, &c., of which the following is a full, clear, and exact description, reference being had to the accompanying drawings, of which—

Figure 1:
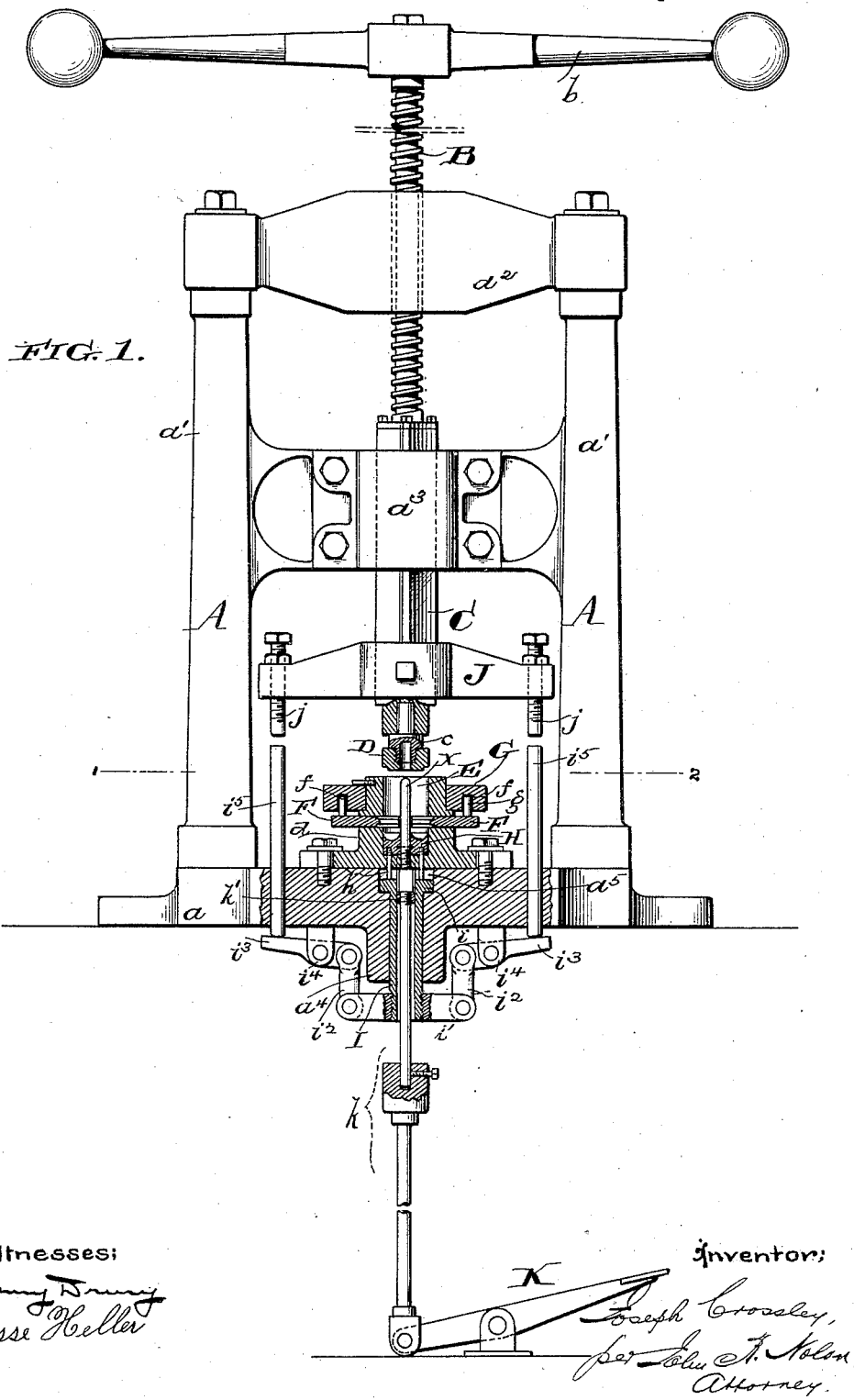
Figure 2:
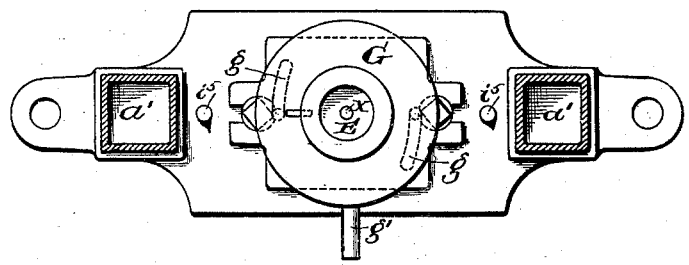
Figure 4:
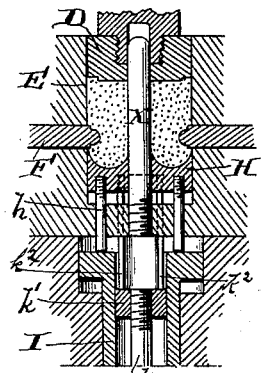
Figure 3:
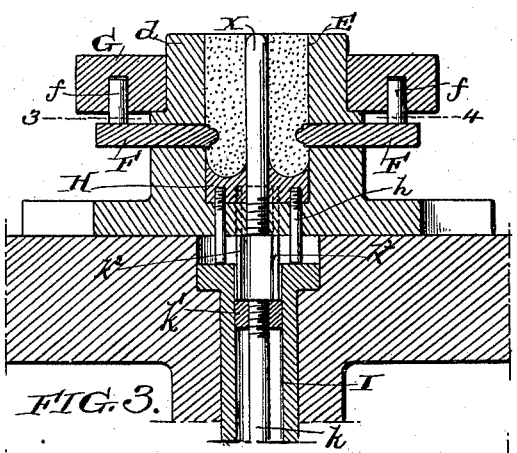
Figure 5:
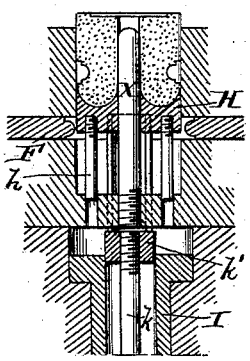
Figure 6:
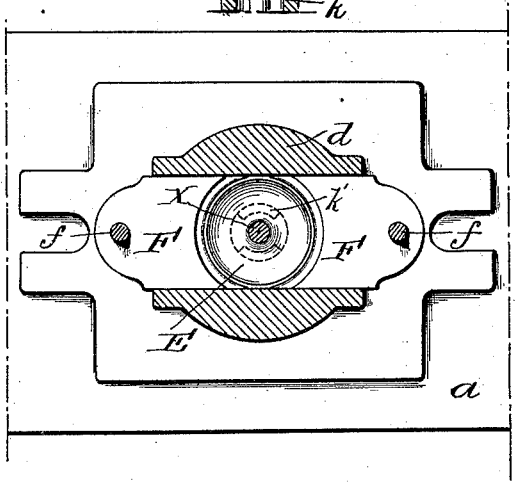

Figure 1 is a sectional elevation of an apparatus embodying my invention. Fig. 2 is a full transverse section as on the line 1 2, Fig. 1. Fig. 3 is an enlarged vertical section through the mold and its adjuncts, the mold being charged with matter preparatory to compression of the latter, and the parts being shown in their relative positions at this stage. Fig. 4 is a similar section showing such matter compressed to form a cast. Fig. 5 is a similar section showing the cast partially expressed from the mold. Fig. 6 is a transverse section as on the line 3 4, Fig. 3, the plastic matter being omitted from the mold. Fig. 7 is a sectional elevation of the lower part of the apparatus, illustrating a slightly-modified construction of the molding or forming members. Figs. 8, 9, and 10 are sections corresponding to Figs. 3, 4, and 5, respectively, but embodying this modified construction. Fig. 11 is a full plan view of Fig. 8 before the introduction of the matter to be molded.

This invention relates more especially to that class of molding apparatus which is used for compressing and fashioning earthenware, more particularly those articles in which are formed lateral perforations, depressions, or ornate configurations—such, for example, as the porcelain supporting parts of electrical structures. As heretofore constructed molding apparatus of this class were defective in their action—that is to say, the pressure exerted by their dies or platens upon the plastic mass within the molds was insufficient to compact or condense the mass uniformly and equally throughout. Hence when the matter so molded was burned or fired there occurred checking or fracturing of that part thereof which was not thoroughly compressed. Thus the appearance of the article was marred or it was rendered wholly unfit for service.

The primary object of my invention is to remedy this defect, and this end I attain by a novel mechanism substantially of the nature hereinafter explained.

Although there is more than one way by which my invention may be carried out, I shall describe that construction only which I consider most efficient and desirable, and shall then define in the claims such matter as I now believe to be within the range of my invention.

Referring to the annexed drawings, particularly to the figures on Sheets 1 and 2, A represents a substantial supporting-frame comprising a bed-plate $a$, two lateral posts or uprights $a'$, and a head-piece $a^2$, uniting the upper ends of these posts or uprights. The head-piece $a^2$ is tapped centrally for the reception of a vertical screw B, which is provided at its upper end with a suitable operating-handle $b$. On the lower end of this screw, so as to be capable of vertical adjustment thereby, is a bar C, which extends through and is guided by an appropriate box $a^3$, sustained at a proper point between the posts $a'$. Secured on the lower end of the bar C is a screw-head $c$, upon which is screwed a die or platen D. Thus the latter may be attached to or detached from this head, as occasion may require.

E represents a mold disposed directly below the die or platen D, which mold is formed within a flanged block $d$, that is bolted or otherwise secured, preferably detachably, to the bed-plate $a$. In the present instance this mold, and perforce the die or platen, are circular in cross-section; but of course the particular form or configuration of these elements, provided they are co-operative, is immaterial, the same being determined by the special shape or character of the article to be molded.

The mold represented in Sheets 1 and 2 of the drawings is designed for the formation of porcelain insulating-posts for electrical wires, which posts, as is well known, are each provided with a peripheral groove or depression for the reception of the wire. To provide for the forming of this groove, I horizontally slot the block $d$ at suitable points on opposite sides of the mold, and within these slots I mount the slide-plates F. The inner edges of the latter are concaved similarly to the adjacent sides of the mold, and these edges are beaded or figured in a manner to coincide with the proposed contour of the groove or depression to be formed in the article to be molded. The plates are adapted to be adjusted horizontally in their slots, so that the figured inner edges of said plates may be projected into or retracted from the mold, for a purpose hereinafter pointed out. To this end the upper surfaces of the plates F are provided with studs $f$, which project into opposite camways $g$, respectively, in the under side of a ring or annulus G, which loosely surrounds the circular upper portion of the block $d$. As this plate may thus be turned partially around that portion on which it is mounted—i. e., within the limit of the camways—it follows that upon the proper turning of the ring the end in view is effected.

To facilitate the operation of turning the ring, I usually provide it with a suitable handle $g'$. Resting upon the bottom of the mold is a die or platen H, the upper or acting face of which is shaped coincident with the form it is desired to impart to the lower end of the article to be molded. This die is provided at suitable points on its under side with pins $h$, which project down through guide-holes in the bottom of the mold-block $d$, whereby pressure upon the lower or free ends of these pins will force the die H upward to perform a function soon to be explained. I shall now proceed to describe a mechanism designed to impart this upward movement to the die H, directing attention in this connection more particularly to Fig. 1 of the drawings. I represents a sleeve which is disposed within a vertical aperture in the base-plate $a$ directly below the mold E, this plate being provided with a suitable boss $a^4$, in which the aperture is formed. The upper end of this aperture immediately beneath the mold-block is countersunk or recessed at $a^5$ for the reception of a collar or flange $i$ on the head of the sleeve. The proportions of the recess are such that the collar or flange may be moved vertically therein a distance equal to the greatest throw it is or may be desired to give to the lower die. The pins $h$ are extended down to or nearly to the collar or flange of the sleeve, so that when the latter is raised its said collar will correspondingly raise the pins and therewith the die from which they extend. The lower portion of the sleeve projects below the boss $a^4$, and this portion has secured thereto a cross-piece $i'$, the ends of which are connected by means of links $i^2$ with the inner arms of horizontal levers $i^3$, respectively, that are pivoted to lugs $i^4$, depending from the under side of the base-plate. This plate is perforated vertically just above the free arms of these respective levers, and within the perforations thus formed are mounted longitudinally-movable rods $i^5$, the lower ends of which rods rest normally upon said arms, respectively, while their upper ends extend some distance upward. Fixed at a proper point upon the screw-operated bar C—that is, of course, below the guide-box $a^3$—is a cross-head J, the ends of which are equipped with vertical set-screws $j$, that extend down to the heads of the rods $i^5$, respectively, or nearly so. By this construction it will be evident that when the bar is forced down by the action of the screw B, as previously described, not only will the die or platen D on the end of the bar be forced down into the upper portion of the mold, but the set-screws $j$ will act upon and forcibly depress the rods $i^5$, which rods in turn will correspondingly move the arms of the levers on which they rest, and the latter being operatively connected with the cross-bar on the lower end of the sleeve will perforce raise said sleeve and therewith the lower die H in the manner hereinbefore stated.

The practical operation of the apparatus is obvious. At the outset the opposed dies are brought into their normal or inactive positions and the lateral forming-plates F are projected into the sides of the mold. The latter is then charged with the properly-prepared mass, usually clay, (I use this term "clay" in its broad sense,) from which it is desired to make the cast. The screw B is then run down, so as to depress the bar C, and thereby cause the die D thereon and the lower die H to act upon the top and bottom of the mass, respectively, so as to compact the mass uniformly throughout, or, in other words, to exert an equal pressure upon those portions of the mass on each side of the inprojecting plates F. The inner edges of the latter obviously form in the cast a peripheral groove or depression, corresponding in cross-section to the contour of such edges. (See Figs. 3, 4, and 5.) The mass having been sufficiently compacted is relieved from pressure by reversing the movement of the screw—that is to say, the upper die is drawn up out of the mold, while the lower die, being freed from the action of the screws on the cross-head J, drops by gravity to its original or down position. The cast is now in condition to be removed from the mold to undergo the baking or firing process. As a simple and efficient means by which it may be ejected from the mold, I have provided the devices exhibited in Fig. 1 of the drawings—namely, a pivoted treadle K, connected by means of the rod or rods $k$ with a slide-piece $k'$, working in the head of the sleeve. The slide-piece extends up through openings in the bottom of the mold by means of rods $k^2$, against which the slide-piece presses, and is fixed to the lower die H. By this arrangement it will be apparent that when the free end of the treadle is depressed and its rod or rods thereby elevated the slide-piece is raised, and with it the die last named, which die consequently pushes the casting up out of the mold, as pictured very clearly in Fig. 5. Upon the removal of the pressure from the treadle the latter and its connections automatically resume their normal positions.

When the cast formed in the manner above stated is subjected to the baking or firing process, there is no liability of its checking or fracturing at any particular point by reason of insufficient compression at that point. This defect arises in those apparatus wherein a single-acting die or platen is employed, the lateral forming devices in such structures, as is manifest, preventing those portions of the plastic mass located below the same being compacted uniformly with the upper portions, or those subjected to the direct pressure of the die or platen. It will be observed that in my construction the pressure exerted by the lower die or platen upon the mass within the mold may be nicely determined by properly adjusting the set-screws on the ends of the cross-head J. I have shown the said die or platen provided with a central pin $x$, which acts as a core to form a central perforation in the cast, it being usual to form a perforation of this kind in articles such as that intended (for illustrative purposes only) to be fashioned in the mold herein specified. Of course the particular configuration of the mold or of the dies or of the lateral forming devices does not in any case affect the present invention, such configuration depending, obviously, upon the special design or nature of the cast in view. This is illustrated in Sheet 3 of the drawings, wherein I have shown my apparatus adapted to the molding of a base or the like for an electrical appliance, in which article there are formed lateral holes for the passage of the wires. In this construction the acting portions of the dies are shaped to impart the requisite form to the faces of the cast while lateral pins F', which work in the sides of the mold, are used to make the holes in the cast. These pins are intended to be projected into or retracted from the mold similarly to the slide-plates above mentioned, and with this view they are fastened to blocks $F^2$, which are furnished on their upper sides with the studs $f$, that engage the camways $g$ in the rotatable ring G, said blocks being guided in their movements by the fixed exterior brackets $g^2$, on which they are mounted. In this modification (presented in Sheet 3) I have shown the bottom of the mold opening directly into the recess $a^5$ in the base-plate and the treadle-rod connected directly with the lower die; but this construction is only an alternative one, which may or may not be employed, as may be most convenient or desirable. I remark in this connection that my invention is not limited to any particular details of construction, as the same may be variously modified to meet special requirements.

I claim—

1. In apparatus for molding ceramics, a mold, dies or platens, and mechanism for operating the same in opposite ends of the mold, in combination with lateral forming devices projected through the wall of the mold between the upper and lower dies.

2. In apparatus for molding ceramics, a mold, a die or platen within and forming the bottom of the mold, horizontal apertures in the wall of the mold and above said die, and a vertically-reciprocating die or platen above said mold, in combination with lateral forming devices supported in the horizontal apertures, means for operating the dies or platens toward each other synchronously, and means for projecting and retracting the lateral forming devices.

3. In apparatus for molding ceramics, a mold, horizontal apertures in the wall of the mold, lateral forming devices, and an annulus, connected thereto and supported by the mold, for projecting and retracting the same, in combination with a suitable die or platen.

4. In apparatus for molding ceramics, a mold, a vertically-movable bar, a die or platen supported by said bar, and a die or platen for the lower end of the mold, in combination with vertical slide-rods, connections between said rods and the latter die, and devices constructed to operate upon the slide-rods only as the bar is moved downward.

5. In apparatus for molding ceramics, a mold, a lower die or platen, and a vertically-movable sleeve for raising said die, in combination with an upper die and means for operating both dies in opposite directions synchronously, and a separate device operating in said sleeve for ejecting the cast from the mold.

6. In apparatus for molding ceramics, the combination of a mold, a lower die, a vertically-movable sleeve below said die, and an upper die, in combination with a vertically-movable bar to which the upper die is attached and supporting a cross-head, sliding rods and suitable connections between said rods, and the sleeve for raising the lower die.

7. In apparatus for molding ceramics, the combination of a supporting-frame, a mold thereon, a vertically-movable bar having a die or platen and a cross-head attached thereto, its operating devices, a die or platen for the lower end of the mold, a vertically-movable sleeve below said mold, vertical slide-rods and means for adjusting the movement thereof, a slide-piece within said sleeve, and a treadle for raising the lower die in the mold.

8. In apparatus for molding ceramics, a mold having horizontal apertures in its walls and lateral forming devices supported in said apertures and provided with studs or pins, in combination with an annulus having cam-grooves on one side and supported by the mold.

9. In apparatus for molding ceramics, a mold provided with a movable die or platen forming the bottom thereof and having pins or studs extending through the lower side of the mold-block, and a vertically-movable sleeve having a collar to engage said pins and a cross-piece at its lower end, in combination with an upper die or platen and suitable connections whereby the lower die is raised proportionately as the upper die descends.

In testimony whereof I have hereunto affixed my signature this 9th day of March, A. D. 1891.

JOSEPH CROSSLEY.

Witnesses:
CLIFFORD COOMBS,
OSCAR DREHER.